3,401,106
PROCESS FOR THE PHOTOCHEMICAL ALKYLATION OF LACTONES AND LACTAMS
Dov Elad, Rehovoth, Israel, Raymond D. Youssefyeh, Pasadena, Calif., and Joel Sinnreich, Tel-Aviv, Israel, assignors to Yeda Research and Development Co. Ltd., Rehovoth, Israel, a corporation of Israel
No Drawing. Filed Aug. 24, 1965, Ser. No. 482,270
Claims priority, application Israel, Dec. 10, 1964, 22,600
14 Claims. (Cl. 204—162)

This invention relates to the alkylation of lactones or lactams, and more particularly to photochemical reactions for alkylating such materials to produce, for example, intermediates useful in the manufacture of polymers and plasticizers.

It will be understood that all parts and percentages in the following specification are given by weight unless otherwise indicated.

It is among the objects of the present invention to provide a relatively simple photochemical process for the preparation of alkylated lactones and lactams by direct alkylation of the lactone or lactam ring.

Other objects and advantages of the process hereof will be more clearly apparent from consideration of the following detailed description of preferred embodiments thereof.

It has been found that alkylated lactams or lactones may readily be prepared by the reaction of a lactone or lactam having the formula:

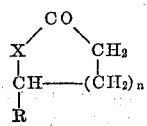

wherein X is O or NH, $n$ is 1, 2, or 3, and R is hydrogen or alkyl having from 1 to 6 carbon atoms, with an olefinic compound having the formula:

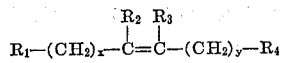

wherein $x$ and $y$ are integers of from 0 to 12, $R_2$ and $R_3$ are each hydrogen or alkyl having from 1 to 12 carbon atoms, and $R_1$ and $R_4$ are each hydrogen, alkyl having from 1 to 12 carbon atoms, —OH, —COOH, —COOR$_5$, or —CONR$_6$R$_7$, in which $R_5$ is alkyl having from 1 to 5 carbon atoms, and $R_6$ and $R_7$ are each hydrogen or alkyl having from 1 to 6 carbon atoms.

In accordance with the invention such compounds are reacted, in proportions of at least about 1 mole of the olefinic material per 200 moles of the lactone or lactam reactant, by exposing the reaction mixture containing such materials to ultraviolet irradiation and, preferably maintaining the reaction mixture in an inert atmosphere, during at least part (if not all) of the exposure period, with agitation.

There is thus produced a class of alkylated lactones and lactams which may, for example, be employed as intermediates in the production of polymers and plasticizers. Such materials have, in fact, previously been suggested for use as monomers for substituted nylons (see, for example, Wolinsky et al., J. Polymer Science, 49, 217 (1961); Graf et al., Angew. Chem., Int. Ed., 9, 481 (1962); and Cubbon, Makromol., 80, 44 (1964)).

The photoalkylation of the present invention proceeds in accordance with the following equations:

(1) 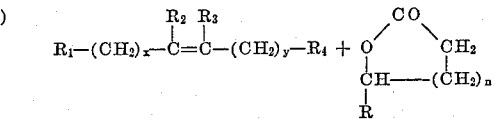

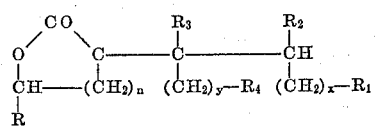

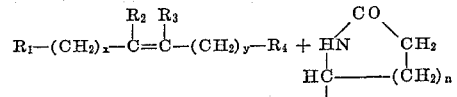

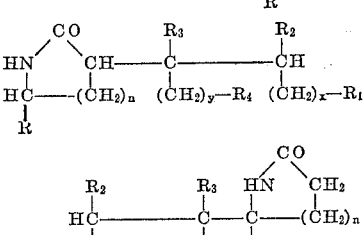

and

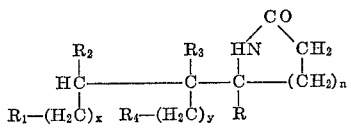

It will be noted that the photoalkylation of a lactone proceeds directly to the 2-alkylated lactone product, whereas the reaction with a lactam results in alkylation at both the carbon atom alpha to the nitrogen, and the carbon atom alpha to the carbonyl functions of the lactam molecule. While the former products may be readily recovered from the reaction mixtures in which they are formed, it is necessary, as will appear hereinafter, to resort to special techniques to effect separation of the position isomers produced by alkylation of the lactam reactants.

Various lactones or lactams may be reacted in accordance with the practice of the process hereof. Hence, while the preferred embodiments described hereinafter make use of gamma-butyrolactone and 2-pyrrolidone as the lactone and lactam reactants, respectively, it will be understood that the invention is not restricted to the use of such materials. Moreover, while the examples given are principally directed to the reaction of 3 to 8 carbon atom terminal olefins of the type RCH=CH$_2$, it is intended that other olefinically unsaturated compounds within the class identified above may similarly be employed.

The olefinic reactant may be reacted with the lactone or lactam in a minor amount with respect thereto, photoadditions being possible with as little as one mole of the olefin per 200 moles of the lactone or lactam. Desirably, from about 1 to 200 moles of the lactone or lactam are reacted per mole of the olefinic compound incorporated in the reaction mixture.

Preferably, the reaction is carried out in the presence of a photosensitizer which facilitates the production of increased yields of the desired alkylated lactones and lactams. Photosensitizers whose use has been found suitable in the practice of the process hereof include acetone, benzophenone, acetophenone and benzaldehyde. Such materials are admixed with the olefinic and lactone or lactam reactants in the proportion of at least about 0.05 mole of the photosensitizer per mole of the lactone or lactam. Preferably, however, the photosensitizer is incorporated in the reaction mixture in amounts of from about 0.2 to 0.4 mole per mole of lactone or lactam, but at least about 0.5 and not more than about 10 moles, per mole of the olefinic reactant.

The photoalkylation reaction is carried out by exposing the reaction mixture to UV light which may either be provided by sunlight or by an artificial light source such as a high pressure mercury vapor lamp. In the case of the latter source of UV radiation, the desired alkylated lactones or lactams can be produced in substantial yields after exposure times of the order of from about 24 to 48 hours.

The alkylation reaction may be carried out at any desired temperature, ordinary ambient temperatures (of the order of 20° C.) being sufficient. Preferably, the reaction mixture is maintained, during all or at least a portion of the reaction period, in an inert atmosphere (such as nitrogen) to exclude oxygen therefrom. Desirably, the reaction mixture is simultaneously agitated to insure homogeneity of the mixture and consequent uniformity of reaction.

In the case of the alkylated lactones excess quantities of the various reagents may be removed by conventional procedures, e.g., by initially distilling the reaction mixture at reduced pressures and thereafter fractionally distilling the residue, to effect separation of the 2-alkylated lactone products. In the case of photoalkylation of lactams, on the other hand, it has been found necessary to separate the isomeric alkylated lactams produced by chromatographic procedures, employing elution by solvent mixtures from silica gel (i.e. kieselgel H) or similar substrates.

The following examples are illustrative of preferred embodiments of the process of the present invention; it will be understood that the invention is not to be restricted to the specific proportions and conditions employed in such embodiments.

Example 1.—Preparation of 2-octylbutyrolactone

A mixture containing 95 ml. of gamma-butyrolactone, 5 ml. of acetone and 0.5 g. of 1-octene was irradiated for one hour by UV radiation from a Hanau Q 81 high pressure mercury vapor lamp. Thereafter, a solution of 5.1 g. of 1-octene in 5 ml. of acetone was added in ten equal portions at one hour intervals, while irradiation was continued; after the completion of the addition, irradiation was continued for a further 12 hours.

The excess reagents were removed under reduced pressure and the residue distilled. The product, 2-octylbutyrolactone, was the fraction boiling at 115–130°/0.4 mm. Hg. After solidification and crystallization from n-pentane the pure product, having a melting point of 19–20° C., was obtained.

Analysis.—Calculated for $C_{12}H_{22}O_2$: C, 72.68%; H, 11.18%. Found: C, 72.80%; H, 11.03%.

Nuclear magnetic resonance spectrum: multiplets centered at $\tau$ 6.3 and 7.8, a singlet at $\tau$ 8.7 and a triplet at $\tau$ 9.15 in the ratio of 2:1:16:3.

Yield: 4.6 g. corresponding to 47% of that theoretically calculated, based on the 1-octene employed.

Example 2.—Preparation of 2-octylbutyrolactone

The reaction carried out in Example 1 was repeated, effecting the photoalkylation by exposure to sunlight. The mixture containing 90 ml. of gamma-butyrolactone, 5 ml. of acetone and 0.5 g. of 1-octene was exposed to sunlight for one day. Thereafter, a solution of 5.1 g. of 1-octene in 5 ml. of acetone was added in seven portions at one day intervals, and the mixture left in direct sunlight for a week after completion of the addition. Employing the same separation procedure described in Example 1, a product identical to that prepared in such example was recovered.

Yield: 6.7 g., corresponding to 68% of that theoretically calculated, based on the 1-octene employed.

For the identification of the 2-octylbutyrolactone obtained in Examples 1 and 2 an authentic sample was prepared as follows:

13.5 g. of octyl diethyl malonate was added to a solution of sodium butoxide (prepared by dissolving 2 g. of sodium in 25 ml. of dry n-butanol), and 8 g. of ethylene-bromohydrin was then added. The reaction mixture was refluxed overnight and the product worked up in a manner known per se to sequentially effect hydrolysis, decarboxylation and lactonization thereof. The product, 2-octylbutyrolactone, was crystallized from pentane, and had a melting point of 19–20° C.

The above reaction proceeded according to the following scheme:

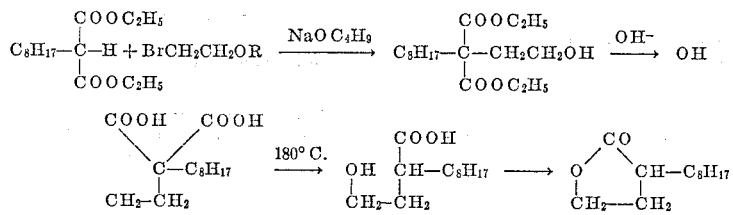

There occurred no depression of the melting point upon admixture of the authentic sample thus prepared with those obtained in accordance with Examples 1 and 2. In each case, the two samples compared possessed identical I.R. spectra and $R_f$ values in thin layer chromatography.

Example 3.—Preparation of 2-heptylbutyrolactone

Employing a procedure substantially the same as that described in Example 2, 2-heptylbutyrolactone having a melting point between 9–10° C. was obtained by reaction of gamma-butyrolactone and 1-heptene. The product was produced in a yield of 65%, based on the 1-heptene employed.

Example 4.—Preparation of 2-decylbutyrolactone

Employing a procedure substantially the same as that described in Example 2, 2-decylbutyrolactone having a melting point between 32–33° C. was obtained by reaction of gamma-butyrolactone and 1-decene. The product was produced in a yield of 60% based on the amount of 1-decene employed.

Example 5.—Preparation of a mixture of 3-octyl and 5-octyl-2-pyrrolidone

A mixture containing 80 ml. of 2-pyrrolidone, 5 ml. of acetone and 0.5 g. of 1-octene was irradiated for one hour by UV radiation from a Hanau Q 81 high pressure mercury vapor lamp. A solution of 5.1 g. of 1-octene in 5 ml. of acetone was then added in ten equal portions at one hour intervals while irradiation was continued. After the completion of the addition of such solution, irradiation was continued for another 12 hours.

The excess of the reagents was removed under reduced pressure and the residue distilled.

The fraction of B.P. 147–150° C./0.4 mm. Hg was the product octyl pyrrolidone of M.P. 56–58° C. (from n-pentane). The product mixture of 3-octyl-2-pyrrolidone and 5-octyl-2-pyrrolidone isomers was chromatographed on kieselgel H using a 4:6 acetone-petroleum ether mixture for elution. 3-octyl-2-pyrrolidone was eluted first. After recrystallization from n-pentane its melting point was 80–81° C.

*Analysis.*—Calculated for $C_{12}H_{23}NO$: C, 73.04%; H, 11.75%; N, 7.10%. Found: C, 73.35%; H, 11.50%; N, 6.94%.

The N.M.R. spectrum of the compound showed multiplets at $\tau$ 6.8 (2H; $R.CH_2N$) and $\tau$ 7.9, a sharp singlet at $\tau$ 8.7 and a triplet at $\tau$ 9.1.

The product was compared with an authentic 3-octyl-2-pyrrolidone sample by means of mixed M.P., infrared spectra, thin layer chromatography and gas-liquid chromatography, and the two were found identical. The authentic 3-octyl-2-pyrrolidone was prepared by reacting 2-octyl-gamma-butyrolactone with ammonia at 300° C.

After the separation of 3-octyl-2-pyrrolidone, the elution was continued with the same solvent mixture, and in this manner 5-octyl-2-pyrrolidone was isolated. After recrystallization of this isomer from n-pentane its M.P. was 60–61° C.

*Analysis.*—Calculated for $C_{12}H_{23}NO$: C, 73.04%; H, 11.75%; N, 7.10%. Found: C, 72.96%; H, 11.63%; N, 7.21%.

The N.M.R spectrum of the product showed multiplets at $\tau$ 6.7 (1H; RCHN) and $\tau$ 7.9, a sharp singlet at $\tau$ 8.7 and a triplet at $\tau$ 9.1.

The composition of the initial isomeric mixture produced was determined by gas-liquid chromatography on 0.2% Apiezon L on glass beads at 300° C. In this manner it was determined that the overall yields of the two isomers were as follows: 3-octyl-2-pyrrolidone: 14% of the theoretical, based on the 1-octene employed; 5-octyl-2-pyrrolidone: 30% of the theoretical, based on the 1-octene employed.

Example 6.—Preparation of a mixture of 3-octyl and 5-octyl-2-pyrrolidone

The same reaction as in Example 5 was carried out in sunlight under the conditions set out in Example 2. The same two isomers were obtained as in Example 5 with the following yields:

|   | Percent |
|---|---|
| 3-octyl-2-pyrrolidone | 17 |
| 5-octyl-2-pyrrolidone | 37 |

Example 7.—Preparation of a mixture of 3-heptyl-2-pyrrolidone and 5-heptyl-2-pyrrolidone 80 ml. of 2-pyrrolidone was reacted with 4.9 g. of 1-heptene under ultraviolet irradiation, employing the same conditions utilized in Example 5. The product was worked up as described in Example 5, the following yields being obtained:

3-heptyl-2-pyrrolidone, M.P. 56–57° C., 14% of the theoretical, based on the amount of 1-heptene employed.

5-heptyl-2-pyrrolidone, M.P. 46–47° C., 31% of the theoretical, based on the amount of 1-heptene employed.

*Analysis.*—Calculated for $C_{11}H_{29}NO$: C, 72.08%; H, 11.55%. Found for 3-heptyl-2-pyrrolidone: C, 72.26%; H, 11.43%. Found for 5-heptyl-2-pyrrolidone: C, 72.19%; H, 11.35%.

Example 8.—Preparation of a mixture of decyl-2-pyrrolidones

Under similar conditions to those employed in Example 5, the reaction between 2-pyrrolidone and 1-decene gave a mixture of decyl-2-pyrrolidones in an overall yield of 43% when an ultraviolet lamp was used for irradiation, and a yield of 53%, when sunlight irradiation was employed.

It will thus be seen that, in accordance with the present invention, a process is provided for the photochemical alkylation of lactones and lactams, the products of which may be employed as intermediates in the preparation of useful polymers, or in the manufacture of plasticizers. Since it will be understood that various changes may be made in the preferred embodiments of such a process described hereinabove without departing from the scope of the invention, it is intended that the above description should be construed as illustrative and not in a limiting sense.

We claim:

1. A process for the alkylation of lactones or lactams, which comprises reacting a lactone or lactam having the formula:

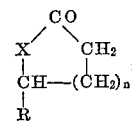

wherein X is O or NH, $n$ is 1, 2, or 3, and R is hydrogen or alkyl having from 1 to 6 carbon atoms, with an olefinic compound:

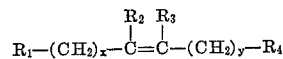

wherein $x$ and $y$ are integers of from 0 to 12; $R_2$ and $R_3$ are each hydrogen or alkyl having from 1 to 12 carbon atoms; and $R_1$ and $R_4$ are each hydrogen, alkyl having from 1 to 12 carbon atoms, —OH, —COOH, —$COOR_5$, or —$CONR_6R_7$, in which $R_5$ is alkyl having from 1 to 5 carbon atoms, and $R_6$ and $R_7$ are each hydrogen or alkyl having from 1 to 6 carbon atoms, by exposing a mixture of said compounds to ultraviolet irradiation.

2. The process as defined in claim 1, in which at least 1 mole of said olefinic compound is reacted with each 200 moles of said lactone or lactam.

3. The process as defined in claim 1, in which said compounds are reacted in admixture with a photosensitizer selected from the group consisting of acetone, benzophenone, acetophenone or benzaldehyde, said sensitizer being incorporated in the reaction mixture in the proportion of from 0.05 to 2 moles per mole of said lactone or lactam, but not more than 20 moles per mole of said olefinic compound.

4. A process for the preparation of a lactone having the formula:

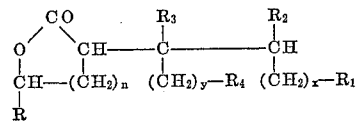

wherein R is hydrogen or alkyl having from 1 to 6 carbon atoms; $R_2$ and $R_3$ are each hydrogen or alkyl having from 1 to 12 carbon atoms; $R_1$ and $R_4$ are each hydrogen, alkyl having from 1 to 12 carbon atoms, —OH, —COOH, —$COOR_5$, or —$CONR_6R_7$, in which $R_5$ is alkyl having from 1 to 5 carbon atoms, and $R_6$ and $R_7$ are each hydrogen or alkyl having from 1 to 6 carbon atoms; $n$ is 1, 2, or 3; and $x$ and $y$ are each integers from 0 to 12; which comprises reacting a lactone having the formula:

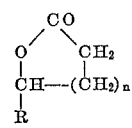

wherein R and $n$ are as defined above, with an olefinic compound:

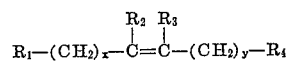

wherein $x$ and $y$ are integers of from 0 to 12; $R_2$ and $R_3$ are each hydrogen or alkyl having from 1 to 12 carbon atoms; and $R_1$ and $R_4$ are each hydrogen, alkyl having from 1 to 12 carbon atoms, —OH, —COOH, —COOR$_5$, or —CONR$_6$R$_7$, in which $R_5$ is alkyl having from 1 to 5 carbon atoms, and $R_6$ and $R_7$ are each hydrogen or alkyl having from 1 to 6 carbon atoms, in the proportion of from 1 to 200 moles of said lactone per mole of said olefinic compound, exposing the reaction mixture to ultraviolet irradiation and maintaining the same, during at least a portion of said irradiation, under an inert atmosphere, with agitation, to effect alkylation of said lactone.

5. The process as defined in claim 4, in which the lactone and olefinic compounds are reacted in admixture with a photosensitizer selected from the group consisting of acetone, benzophenone, acetophenone, or benzaldehyde, said sensitizer being incorporated in the reaction mixture in the proportion of from 0.05 to 1 mole per mole of the lactone reactant, but not more than 20 moles per mole of said olefinic compound.

6. A process for the preparation of lactams having the formulae:

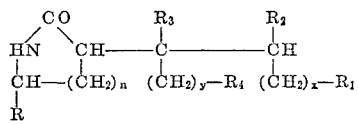

and

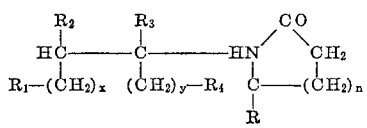

wherein R is hydrogen or alkyl having from 1 to 6 carbon atoms; $R_2$ and $R_3$ are each hydrogen or alkyl having from 1 to 12 carbon atoms; $R_1$ and $R_4$ are each hydrogen, alkyl having from 1 to 12 carbon atoms, —OH, —COOH, —COOR$_5$, or —CONR$_6$R$_7$, in which $R_5$ is alkyl having from 1 to 5 carbon atoms, and $R_6$ and $R_7$ are each hydrogen or alkyl having from 1 to 6 carbon atoms; $n$ is 1, 2, or 3; and $x$ and $y$ are integers of from 0 to 12; which comprises reacting a lactam of the formula:

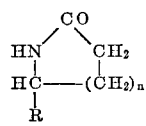

wherein R and $n$ are as defined above, with an olefinic compound:

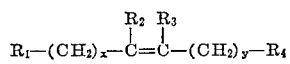

wherein $x$ and $y$ are integers of from 0 to 12; $R_2$ and $R_3$ are each hydrogen or alkyl having from 1 to 12 carbon atoms; and $R_1$ and $R_4$ are each hydrogen, alkyl having from 1 to 12 carbon atoms, —OH, —COOH, —COOR$_5$, or —CONR$_6$R$_7$, in which $R_5$ is alkyl having from 1 to 5 carbon atoms, and $R_6$ and $R_7$ are each hydrogen or alkyl having from 1 to 6 carbon atoms, in the proportion of 1 to 200 moles of said lactam per mole of said olefinic compound, exposing the reaction mixture to ultraviolet irradiation, and maintaining the same, during at least a portion of the irradiation, under an inert atmosphere, with agitation, to produce said lactam.

7. A process as defined in claim 6, in which the lactone and the olefinic compound are reacted in admixture with a photosensitizer selected from the group consisting of acetone, benzophenone, acetophenone, and benzaldehyde, said sensitizer being incorporated in the reaction mixture in the proportion of from 0.05 to 1 mole per mole of the lactam reactant, but not more than 20 moles per mole of said olefinic compound.

8. The process as defined in claim 6, in which the said lactam products are separated chromatographically by elution from a silica gel substrate.

9. A process for the preparation of 2-octylbutyrolactone, which comprises reacting gamma-butyrolactone with 1-octene in the proportion of from 1 to 200 moles of said lactone per mole of said 1-octene and in admixture with from 0.05 to 1 mole of an acetone photosensitizer per mole of said lactone, by exposing the mixture of such materials to ultraviolet irradiation to produce 2 - octylbutyrolactone.

10. A process for the preparation of 2-heptyl-butyrolactone, which comprises reacting gamma-butyrolactone with 1-heptene in the proportion of from 1 to 200 moles of said lactone per mole of said 1-heptene and in admixture with from 0.05 to 1 mole of an acetone photosensitizer per mole of said lactone, by exposing the mixture of such materials to ultraviolet irradiation to produce 2-heptylbutyrolactone.

11. A process for the preparation of 2-decylbutyrolactone, which comprises reacting gamma-butyrolactone with 1-decene in the proportion of from 1 to 200 moles of said lactone per mole of said 1-decene, and in admixture with from 0.05 to 1 mole of an acetone photosensitizer per mole of said lactone, by exposing the mixture of such materials to ultraviolet irradiation to produce 2-decylbutyrolactone.

12. A process for the preparation of a mixture of 3-octyl - 2 - pyrrolidone and 5-octyl-2-pyrrolidone, which comprises reacting 2-pyrrolidone with 2-octene in the proportion of from 1 to 200 moles of the lactam material per mole of said 1-octene and in admixture with from 005 to 1 mole of an acetone photosensitizer per mole of said lactam by exposing the mixture of such materials to ultraviolet irradiation to produce a mixture of 3-octyl-2-pyrrolidone and 5-octyl-2-pyrrolidone.

13. A process for the preparation of a mixture of decyl-2-pyrrolidones, which comprises reacting 2-pyrrolidone with 1-decene in the proportion of from 1 to 200 moles of the lactone reactant per mole of said 1-decene and in admixture with from 0.05 to 1 mole of an acetone photosensitizer per mole of said lactone, by exposing the mixture of such materials to ultraviolet irradiation, to produce a mixture of decyl-2-pyrrolidones.

14. A process for the preparation of a mixture of 3-heptyl-2-pyrrolidone and 5-heptyl-2-pyrrolidone, which comprises reacting 2-pyrrolidone with 1-heptene in the proportion of from 1 to 200 moles of said lactone per mole of said 1-heptene and in admixture with from 0.05 to 1 mole of an acetone photosensitizer per mole of said lactone, by exposing the mixture of such materials to ultraviolet irradiation, to produce a mixture of 3-heptyl-2-pyrrolidone and 5-heptyl-2-pyrrolidone.

References Cited

UNITED STATES PATENTS 2,603,658   7/1952   Hanusch _____ 260—515

HOWARD S. WILLIAMS, *Primary Examiner.*